United States Patent
Hall et al.

[11] Patent Number: 5,927,426
[45] Date of Patent: Jul. 27, 1999

[54] TRACTION CONTROL SYSTEM FOR USE WITH FOUR WHEEL DRIVE VEHICLES HAVING ON-DEMAND TRANSFER CASES

[75] Inventors: Thomas J. Hall, Holly; Robert S. Perkins, III, White Lake, both of Mich.

[73] Assignee: ITT Automotive Inc., Auburn Hills, Mich.

[21] Appl. No.: 08/733,829

[22] Filed: Oct. 18, 1996

[51] Int. Cl.[6] ................................................. B60K 17/34
[52] U.S. Cl. ............................ 180/249; 180/197; 701/89
[58] Field of Search ................................... 180/233, 247, 180/248, 249, 197; 701/69, 84, 89

[56] References Cited

U.S. PATENT DOCUMENTS

| | | |
|---|---|---|
| 3,968,704 | 7/1976 | Fogelberg . |
| 5,105,131 | 4/1992 | Schap . |
| 5,132,908 | 7/1992 | Eto et al. ................................ 180/197 |
| 5,163,744 | 11/1992 | Tierney et al. . |
| 5,215,160 | 6/1993 | Williams et al. . |
| 5,272,635 | 12/1993 | Nakayama ............................ 180/197 |
| 5,275,252 | 1/1994 | Sperduti et al. . |
| 5,275,253 | 1/1994 | Sperduti et al. . |
| 5,373,447 | 12/1994 | Howes et al. . |
| 5,387,031 | 2/1995 | Watanabe . |
| 5,407,024 | 4/1995 | Watson et al. . |
| 5,469,359 | 11/1995 | Tsuyama et al. . |
| 5,485,894 | 1/1996 | Watson et al. . |
| 5,492,194 | 2/1996 | McGinn et al. . |
| 5,701,247 | 12/1997 | Sasaki .................................... 180/197 |
| 5,752,211 | 5/1998 | Takasaki et al. ....................... 180/197 |

*Primary Examiner*—Lanna Mai
*Assistant Examiner*—Avraham H. Lerner
*Attorney, Agent, or Firm*—Rader, Fishman & Grauer PLLC

[57] ABSTRACT

A traction control system for a four wheel drive vehicle including generating a first value corresponding to an average rotational speed of front wheels, generating a second value corresponding to an average of a rotational speed of rear wheels, comparing the first and second values, and generating a first signal corresponding to a difference between the first and second values, are provided. The first signal is used for transferring torque to the secondary axle if the rear wheels are rotating faster than the front wheels. The system also generates a second signal corresponding to a difference in speed between a first axle shaft and a second axle shaft of the front axle. The second signal is used for transferring torque to the other of the front axle shafts if the one of the secondary axle shafts is rotating faster than the other of the front axle shafts.

2 Claims, 5 Drawing Sheets

TRACTION CONTROL SYSTEM FOR USE WITH FOUR WHEEL DRIVE VEHICLES HAVING ON-DEMAND TRANSFER CASES

FIELD OF THE INVENTION

The present invention relates to traction control systems in four wheel drive vehicles, and more particularly, to traction control systems for use with on-demand four wheel drive systems.

BACKGROUND OF THE INVENTION

Traction control systems are commonly integrated into anti-lock braking systems. Anti-lock braking systems typically modulate the pressure of hydraulic fluid delivered to a vehicle wheel brake to prevent the vehicle wheel from locking up in the braking condition. Conversely, a traction control system, when integrated into the anti-lock braking system, actuates the brakes to prevent spinning of a vehicle wheel, thereby maximizing the traction which can be exerted by that wheel.

On-demand four wheel drive systems enable an automatic switching from two wheel drive used during normal operating conditions to four wheel drive responsive to slippage of the primary axle used for two wheel drive. On-demand four wheel drive systems can also be placed in the four wheel drive mode by the driver actively selecting that mode with a switch or button.

Known traction control systems for four wheel drive vehicles operate independently of engagement of the secondary axle through a transfer case. The benefit of traction control in preventing slipping, and maintaining the stability of vehicle handling under slippery conditions, for a four wheel drive vehicle is greatly reduced when the four wheel drive system is operating in a two wheel drive mode, particularly if the rear wheels are being driven in the two wheel drive mode.

Four sensor anti-lock systems employ a wheel rotation speed sensor at each of the four vehicle wheels, enabling individual braking control of each wheel. Three sensor anti-lock braking systems are a less expensive alternative to the four sensor systems. With three sensor systems, each of the two front wheels in the vehicle has a wheel speed sensor, and a third sensor is used to monitor the speed of the rear drive shaft. Given that the rolling radius of the vehicle wheels and the final drive axle ratio for the front and rear axles are known, the speeds of the wheels and the axle shaft can be compared to determine if there is any incipient wheel lock up occurring in either of the front wheels, or of either of the rear wheels during a brake application. If such incipient lock up is detected, the front two wheels can be controlled individually, and the two rear wheels can be controlled simultaneously with each other by selectively relieving brake pressure.

It is desired to provide a traction control system compatible with on-demand four wheel drive systems and further compatible with both three sensor and four sensor anti-lock brake systems.

SUMMARY OF THE INVENTION

A traction control system for a four wheel drive vehicle includes a rear axle, a front axle, a transfer case connecting the rear axle and the front axle, a hydraulic circuit, and an electronic controller. The rear axle has rotatable left rear and right rear axle shafts and a rotatable rear pinion member. A left rear wheel is rotatably fixed to the left rear axle shaft. A right rear wheel is rotatably fixed to the right rear axle shaft. A left rear wheel brake is functionally disposed between a non-rotatable structure of the vehicle and the left rear wheel wherein the left rear wheel brake operably resists rotation between the left rear wheel and the vehicle structure. Similarly, a right rear wheel brake is functionally disposed between the same or a different non-rotatable structure of the vehicle and the right rear wheel wherein the rear right wheel brake operably resists rotation between the right rear wheel and the vehicle structure. The front axle has rotatable left front and right front axle shafts and a rotatable front pinion member. A left front wheel is rotatably fixed to the left front axle shaft. A front right wheel is rotatably fixed to the front right axle shaft. A left front wheel brake is functionally disposed between a non-rotatable structure of the vehicle and the left front wheel wherein the left front wheel brake operably resists rotation between the front left wheel and the vehicle structure. Similarly, a right front wheel brake is functionally disposed between a non-rotatable structure of the vehicle and the right front wheel wherein the right front wheel brake operably resists rotation between the right front wheel and the vehicle structure. The transfer case has an input shaft receiving input torque from a drive unit and also has a primary output shaft rotatably connected to the rear pinion member and to the input shaft. The transfer case also has a secondary output shaft rotatably connected to the front pinion member. The transfer case further includes a selectively engageable clutch rotatably connecting the primary output shaft with the secondary output shaft. The clutch is responsive to an electrical signal and is electrically connected to the electronic controller. A source of pressurized fluid is electrically connected to the electronic controller and is responsive to electrical signals therefrom. A hydraulic circuit connects the source of pressurized fluid with the wheel brakes. A first solenoid operated valve is disposed in the hydraulic circuit between the source of pressurized fluid and the left front brake, selectively blocking a flow of hydraulic fluid from the source of pressurized fluid to the left front wheel brake. The first solenoid operated valve is responsive to an electrical signal and is electrically connected to the electronic controller. A second solenoid operated valve is disposed in the hydraulic circuit between the source of pressurized fluid and the right front wheel brake, selectively blocking a flow of hydraulic fluid from the source of pressurized fluid to the right front wheel brake. The second solenoid operated valve is responsive to an electrical signal and is electrically connected to the electronic controller. A third solenoid operated valve is disposed in the hydraulic circuit between the source of pressurized fluid and at least one of the rear wheel brakes and selectively blocks a flow of hydraulic fluid from the source of pressurized fluid to the at least one of the wheel brakes. The third solenoid operated valve is responsive to an electrical signal and is electrically connected to the electronic controller. A first rotary speed sensor is located at one of the left front wheel and a part that rotates substantially in unison with the left front wheel. The first rotary speed sensor provides an electrical signal corresponding to the speed of the left front wheel and is electrically connected to the electronic controller. A second rotary speed sensor is located at one of the right front wheel and a part that rotates substantially in unison with the right front wheel. The second rotary speed sensor provides an electrical signal corresponding to the speed of the right front wheel and is electrically connected to the electronic controller. A third rotary speed sensor is located proximate to a rear ring gear or any element rotating at a fixed speed ratio with respect to the rotary speed of the rear ring gear including a rear pinion enabling an approximate measurement of the rotary speed of the rear ring gear. The third rotary speed sensor provides an electrical signal relating to the speed of the rear ring gear and is electrically connected to the electronic controller. The electronic controller includes means for determining values relating to the rotative speeds of the front and rear ring gears using signals from the sensors and also including means for comparing the values relating to the front and rear rotative speed signals and means for generating an electrical signal used to control the clutch within the transfer case based on a difference between the values relating to the front axle and rear axle ring gear speeds. The electronic controller also includes means for comparing the electrical signals from the first and second rotary speed sensors after engagement of the transfer case clutch and generating a signal to the source of pressurized fluid and a signal to at least one of the first and second valves responsive to a difference in signals from the front rotary speed sensors indicative of a slipping front wheel wherein a brake torque applied to the slipping front wheel transfer torque to the non-slipping front wheel.

A traction control system for a four wheel drive vehicle includes means for generating signals, means for comparing signals, and means for transferring torque. Means for generating a first value corresponding to an average of a rotational speed of front wheels, means for generating a second value corresponding to an average of a rotational speed of rear wheels, means for comparing the first and second values, and means for generating a first signal corresponding to a difference between the first and second values, are provided. The signal signal corresponding to the difference in average wheel speeds is used by means for transferring torque to the secondary axle if the rear wheels are rotating faster than the front wheels. Also provided is means for generating a second signal corresponding to a difference in speed between a left axle shaft and a right axle shaft of the front axle. The second signal is used by means for transferring torque to the other of the front axle shafts if the one of the front axle shafts is rotating faster than the other of the front axle shafts.

A method for developing driving traction in a four wheel drive vehicle includes the steps of generating a first value corresponding to an average of a rotational speed of front wheels, generating a second value corresponding to an average of a rotational speed of rear wheels, comparing the first and second values, and generating a first signal corresponding to a difference between the first and second values, and transferring torque to the secondary axle if the rear wheels are rotating faster than the front wheels. The method also includes the steps of generating a second signal corresponding to a difference in speed between a left axle shaft and a right axle shaft of the front axle, and transferring torque to the other of the front axle shafts if one of the front axle shafts is rotating faster than the other of the front axle shafts.

A traction control system is provided which is compatible with on-demand four wheel drive systems, and anti-lock brake systems employing either three sensors or four sensors.

Other features of the invention will become apparent by reference to the following specification and to the drawings.

DETAILED DESCRIPTION OF PREFERRED EMBODIMENTS

Figure 1:
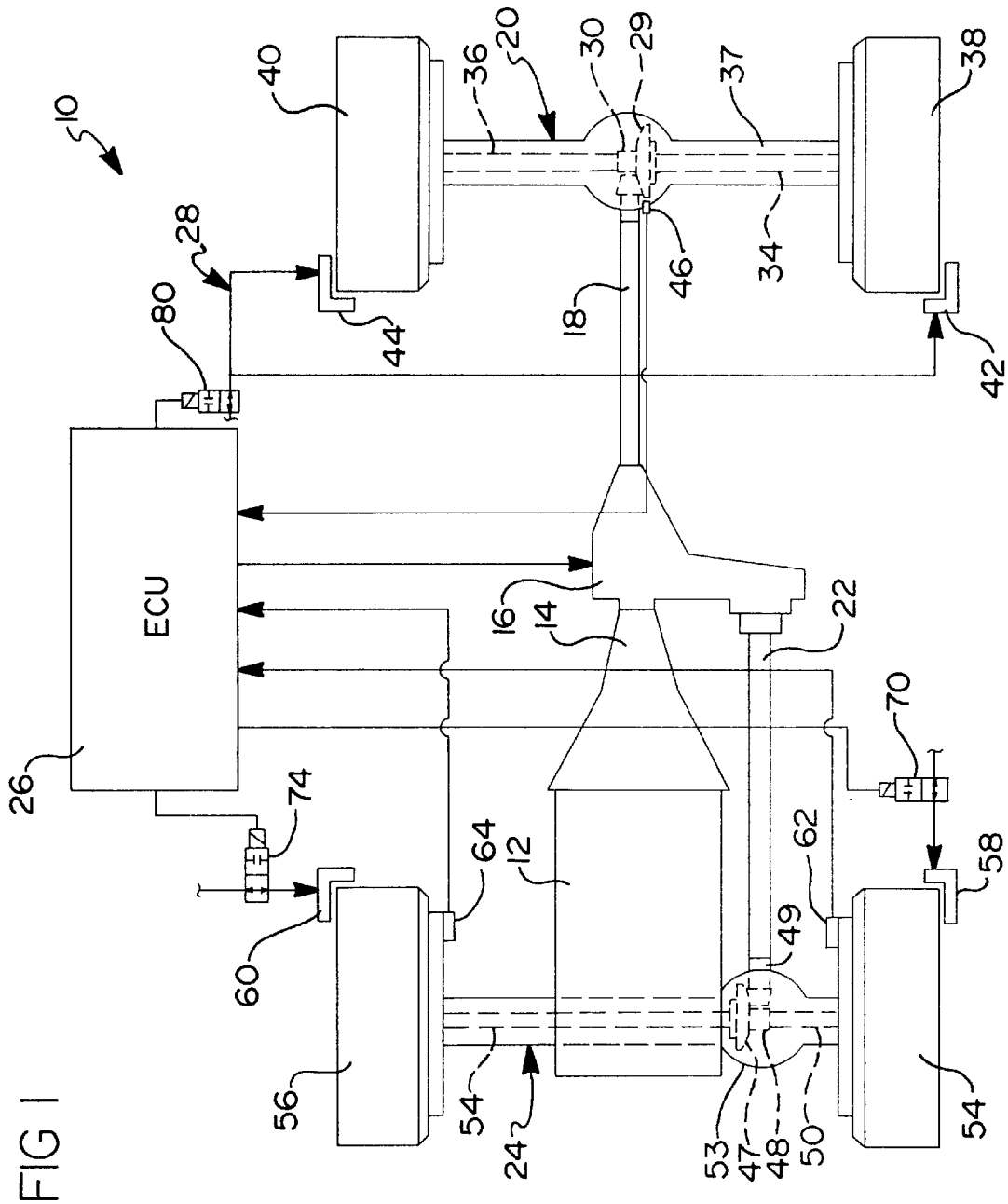
FIG. 1 is a schematic representation of the mechanical elements of a first embodiment of the invention with some of the control elements also shown in schematic form.
Figure 3:
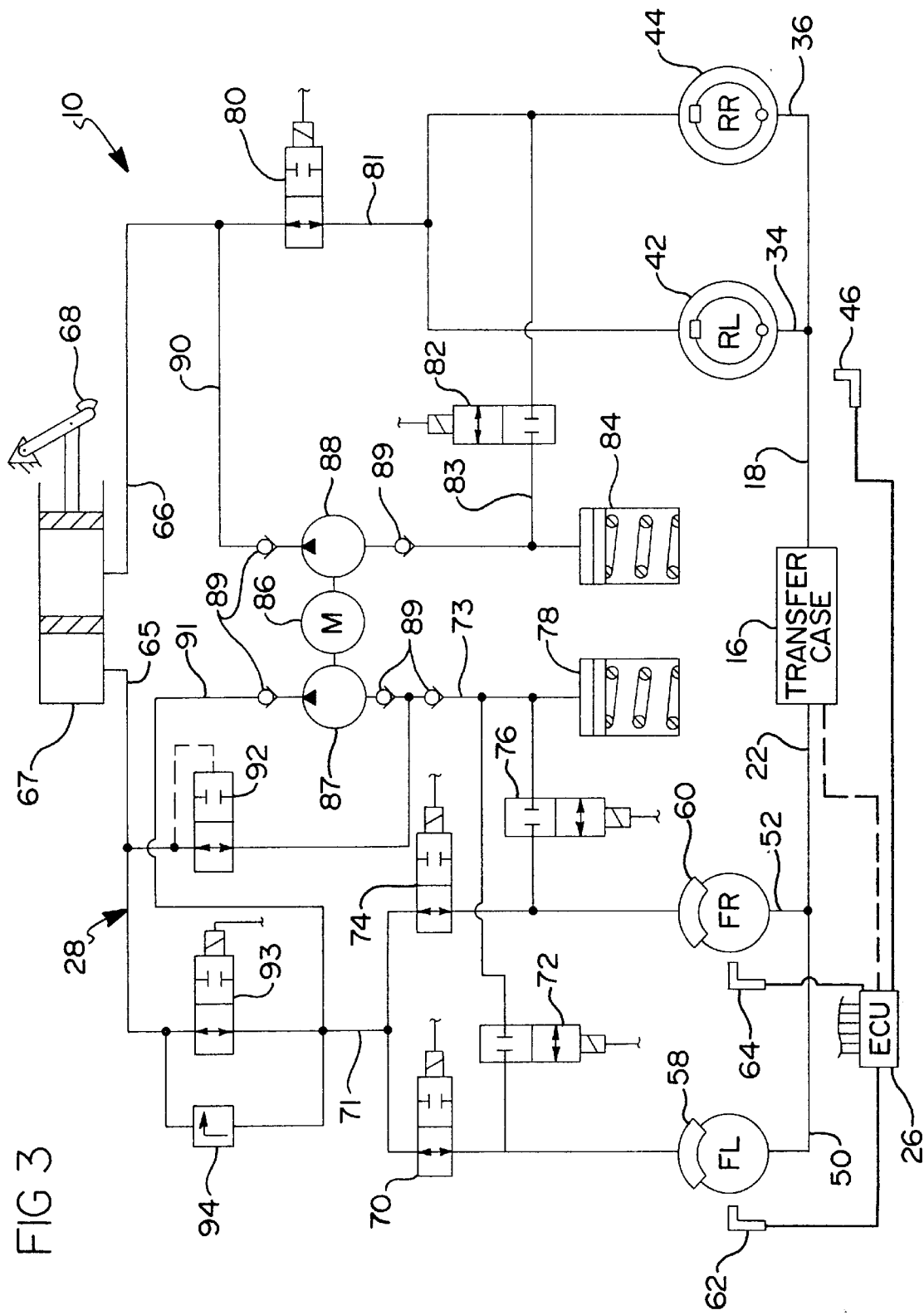
FIG. 3 is a schematic representation of the control system used with a first embodiment of the invention.

An integrated traction control/anti-lock brake system 10 employing three speed sensors is shown schematically in FIGS. 1 and 3, which for the purpose of brevity, will be referred to as the traction control system 10. Traction control system 10 is shown integrated into a four wheel drive vehicle, with the configuration shown being typical of that used for light trucks.

An engine 12 is mounting at the front of the vehicle in a fore-aft direction. A transmission 14 is mounted to a rear of the engine 12 and receives torque therefrom. A transfer case 16 is mounted to the rear of transmission 14 and receives torque therefrom. A primary or rear drive shaft 18 connects transfer case 16 with primary or rear axle 20. A secondary or front drive shaft 22 extends from a forward side of transfer case 16 to secondary or front axle 24.

An electronic controller or control unit (ECU) 26 is electrically connected to various signal sources and to a plurality of controlled elements, including transfer case 16 as well as valves in traction control system 10.

A hydraulic control circuit 28, while shown in part in FIG. 1, is shown substantially in its entirety in FIG. 3. Valves controlled by ECU 26 are disposed in hydraulic control circuit 28.

Rear axle 20 as best seen in FIG. 1 includes a rear axle ring gear 29 fixed to a differential 30 driven by a rear pinion 32. A left rear axle shaft 34 and a right rear axle shaft 36 are both connected to differential 30 and are disposed within rear axle housing 37. Rear axle housing 37 typically consists of a cast iron differential housing with steel tubes extending therefrom enclosing right and left axle shafts 36 and 34. Rear axle housing 37 comprises a significant part of the vehicle structure and is attached to a vehicle frame (not shown) by suspension springs and shock absorbers. Other examples of vehicle structural elements include the frame, steering knuckles, suspension struts, and the vehicle body. Axle housing 37 may also be engaged by struts (not shown) pivotably connecting it with the vehicle frame (not shown). It should be appreciated that alternative rear axle structures can be employed without any effect on this invention. An axle suited for use with independent suspension, employing light weight alloy differential housings, and no axle tube, is but one alternative example.

A left rear wheel 38 is rotatably fixed to left rear axle shaft 34 for rotation therewith. A right rear wheel 40 is rotatably fixed to right rear axle shaft 36 for rotation therewith. Other elements, such as brake rotors or drums may rotate in unison with the wheels as well.

A left rear brake 42 and a right rear brake 44 are shown schematically in FIG. 1 as disposed outside left rear wheel 38 and right rear wheel 40. It should be appreciated that the actual brakes would be disposed radially within wheels 38 and 40 as is normally found in motor vehicles. The term wheel as used in the present application is intended to refer to the combination of a tire and wheel.

A rear ring gear speed sensor 46 is shown disposed at the rear differential 30 proximate to ring gear 29. Alternatively, sensor 46 may be located within transfer case 16, at rear pinion 32, or proximate to any element that rotates at a fixed ratio of speed with respect to ring gear 29. Where ever sensor 46 is located, it must provide a rotation signal at a fixed ratio to rotation of ring gear 29.

Front axle 22 includes a front differential 48 with a ring gear 47 driven by a front pinion 49. A front left axle shaft and a front right axle shaft 50 and 52 respectively extend from front differential 48.

A front axle housing 53 is shown enclosing front ring gear 47, differential 48, front left axle shaft 50 and front right axle shaft 52. Ring gear 47 is fixed to differential 48 for unitary rotation therewith. Front axle housing 53 comprises part of the vehicle structure, similar to rear axle housing 37. It should be appreciated that as with rear axle 20, there are alternative configurations to the front axle illustrated here. One alternative type of construction is to provide an axle housing which encloses substantially only the differential. The axle shafts are joined to the differential by flanges or universal joints.

A left front wheel 54 and a right front wheel 56 are rotatably connected to the front left axle shaft 50 and the front right axle shaft 52 respectively. Left front brake 58 and right front brake 60 are shown schematically in FIG. 1.

A common feature in four wheel drive vehicles, particularly in light trucks, is a mechanism enabling the disconnection of front wheels 54 and 56 from differential 48 so that when the vehicle is operating in the two wheel drive mode, the wheels 54 and 56 are not backdriving differential 48 and drive shaft 22. This is done primarily to conserve fuel, and secondarily to reduce noise. One method of achieving this is to provide hub locks (not shown) between each of wheels 54 and 56 and their respective axle shafts 50 and 52. Such hub locks are well known in the field of four wheel drive vehicles. Alternatively, a center disconnect can be provided proximate to differential 48, disconnecting one of axle shafts 50 and 52 from differential 48. With the axle shaft disconnected, wheels 54 and 56 cannot back drive differential 48. It is assumed for the purposes of this disclosure that if the wheels 54 and 56 are not constantly drivingly engaged with differential 48, then the chosen axle connect/disconnect means will provide the desired connection to enable the transmission of torque from transfer case 16 to wheels 54 and 56.

A left front wheel speed sensor 62 is located proximate to wheel 54. Similarly, right front wheel speed sensor 64 is located proximate to wheel 56. It should be appreciated that wheel speed sensors 62 and 64 can be positioned anywhere convenient to any object having a fixed rotational relationship with the wheels 54 and 56, such as their respective brake rotors. It is anticipated that sensors 46, 62, and 64 will be magnetic pickups although other known rotational speed sensors, such as magneto resistive sensors, or Hall effect sensors may be used instead.

Hydraulic circuit 28, best shown in FIG. 3, is a split system, having a front portion 65 and a rear portion 66. Both the front portion 65 and rear portion 66 are pressurized by a master cylinder 67 acted upon by a brake pedal 68. Commonly, a power booster (not shown) is disposed between brake pedal 68 and master cylinder 67 to provide an assist to the driver in applying braking force to the master cylinder.

A left front pressure cut-off valve 70 is disposed along front circuit portion 65 between master cylinder 67 and brake 58. A left front pressure relief solenoid operated valve 72 is connected to pressure line 71 at a point between brake 58 and valve 70 and is connected on its other side to a relief line 73.

A right front solenoid operated pressure cut off valve 74 is connected to pressure line 71 in parallel with left front solenoid operated pressure cut off valve 70, between master cylinder 67 and brake 60. A right front solenoid operated pressure relief valve 76 is connected on one side to pressure line 71 between valve 74 and brake 60, and on a second side to relief line 73. A front low pressure accumulator 78 is also connected to relief line 73.

Rear circuit 66 has only one cut-off valve 80 and only one relief valve 82 which control both rear brakes 42 and 44. Rear axle solenoid operated pressure cut-off valve 80 is disposed in rear pressure line 81 between master cylinder 67 on one side and both rear brakes 42 and 44 on the other side. Rear axle solenoid operated pressure relief valve 82 is connected on one side to rear pressure line 81 between valve 80 and brakes 42 and 44, and is connected on the other side to rear relief line 83. A rear low pressure accumulator 84 is also connected to relief line 83. A pump motor 85 is drivingly connected to a front circuit pump 87 and a rear circuit pump 88. Check valves 89 are disposed along relief lines 73 and 83 and prevent flow from pumps 87 and 88 backward through relief lines 73 and 83 respectively. A rear return line 90 connects an output side of pump 88 with pressure line 81 between master cylinder 67 and valve 80. A front return line 91 is connected to an output side of pump 87. Check valves 89 are also disposed on an output side of both pumps 87 and 88, preventing fluid from being forced back into the output side of pumps 87 and 88.

A pressure biased valve 92 is disposed between pressure line 71 at a point between valves 70 and 74, and master cylinder 67, and relief line 73 between check valve 89 and an intake side of pump 87. Another check valve 89 is disposed between the intake port of pump 87 and the connection between valve 92 and relief line 73. Valve 92 is biased such that if pressure in master cylinder 67 is greater than that in accumulator 78, then valve 92 closes. Valve 92 is typically closed when the brake pedal 68 is depressed and open when it is not.

A solenoid operated traction control valve 93 is disposed along pressure line 71 between valves 70 and 74, and where valve 92 connects to pressure line 71. A pressure relief valve 94 is parallel with valve 93 along pressure line 71. Front return line 91 connects to pressure line 71 between valve 93 and valves 70 and 74. Valves 70, 72, 74, 76, 80, 82, and 93 are electrically connected to 26 and are responsive to electrical signals therefrom.

Figure 4:
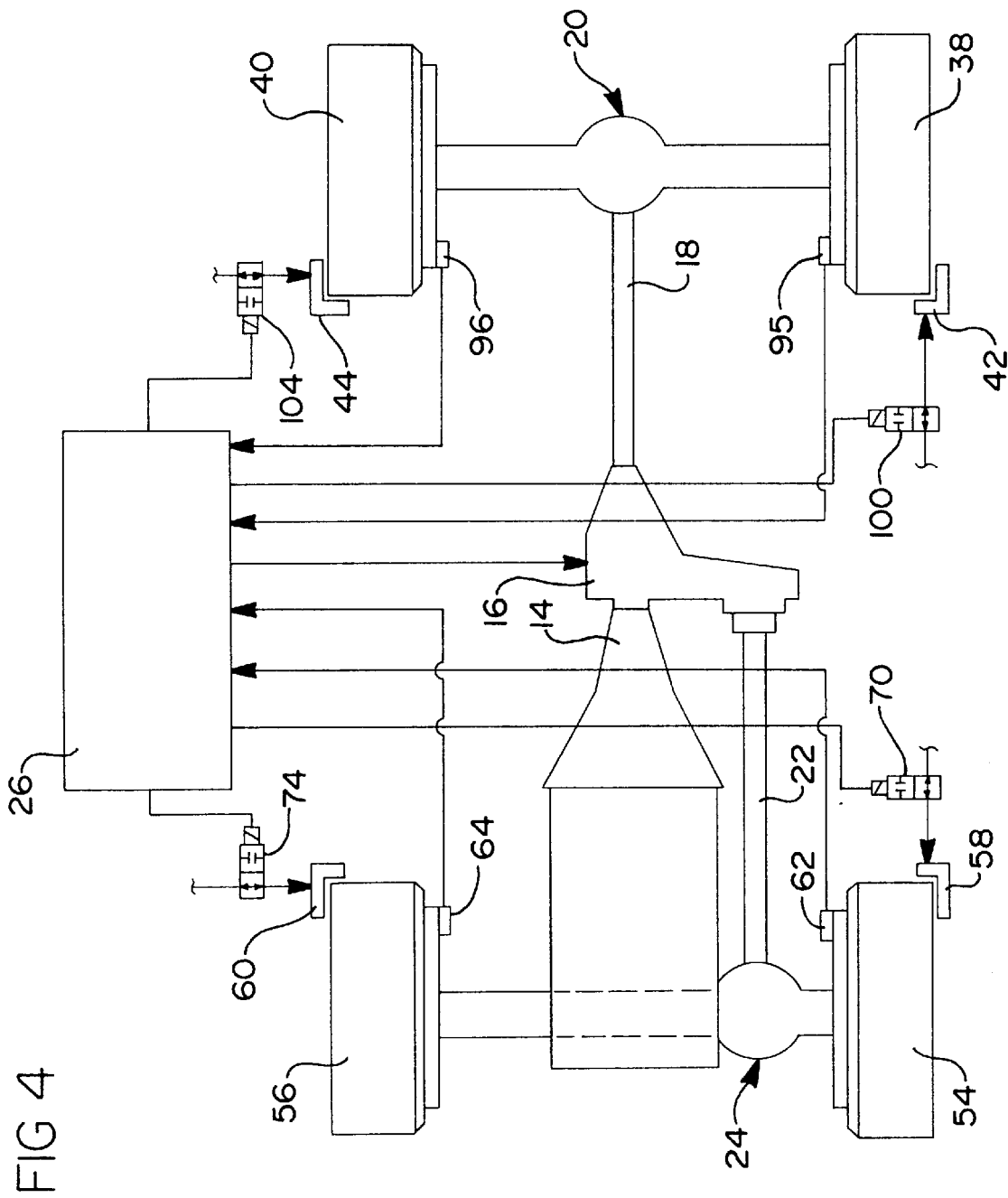
FIG. 4 is a schematic representation of the mechanical elements of a second embodiment of the invention with some of the control elements also being shown.
Figure 5:
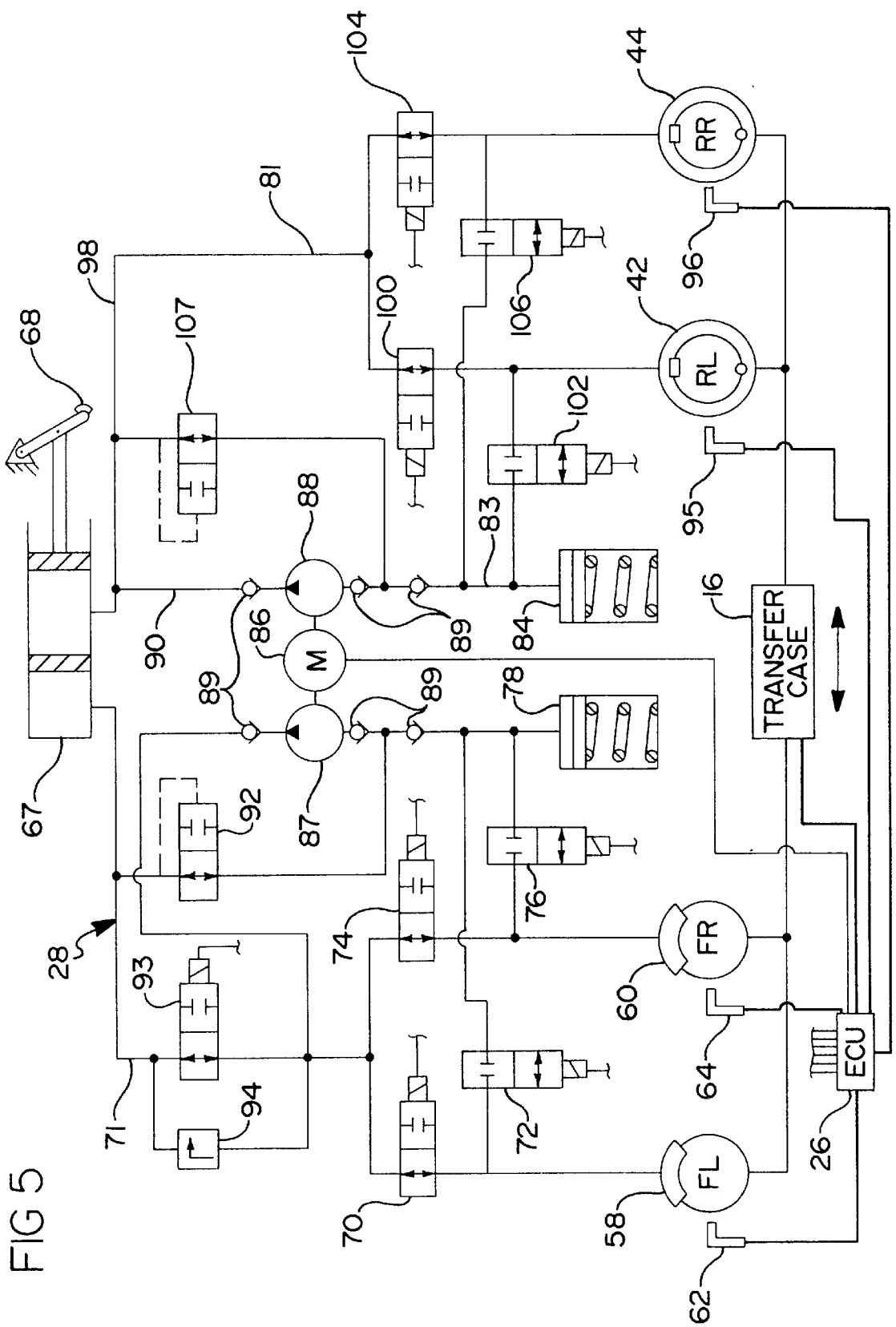
FIG. 5 is a schematic representation of the control system used with the second embodiment of the invention.

An alternative form of traction control system 10 is shown in FIGS. 4 and 5, differing principally in that it employs four wheel speed sensors instead of three. Since four wheel speed sensors are employed, there is a set of controlling valves for each wheel of the rear axle, instead of a single set for the entire axle. A left rear wheel speed sensor 95 and a right rear wheel speed sensor 96 are located proximate to left and right rear wheels 38 and 40.

As shown in FIG. 5, front circuit portion 65 remains unchanged. However, an alternative rear circuit portion 98 is employed. A left rear solenoid operated pressure cut-off valve 100 is disposed in rear pressure line 81 between master cylinder 67 and left rear brake 42. A left rear solenoid operated pressure relief valve 102 is disposed between pressure line 81 at a point between valve 100 and brake 42, and relief line 83.

Right rear solenoid operated pressure cut-off valve 104 is disposed in parallel with valve 100 along pressure line 81 between master cylinder 67 and right rear brake 44. A right rear solenoid operated pressure relief valve 106 is disposed between pressure line 81 at a point between valve 104 and brake 44, and pressure relief line 83. Accumulator 84 is also connected to pressure relief line 83. A check valve 89 is disposed between an inlet side of pump 88 and accumulator 84 blocking a flow of fluid from pump 88. A pressure biased valve 107 is disposed between pressure line 81 and relief line 83. The connection to relief line 83 is made between check valve 89 and yet another check valve 89 disposed proximate to the inlet port of pump 88. Return line 90 connects an outlet side of pump 88 with rear pressure line 81 at a point between valve 107 and master cylinder 67.

Figure 2:
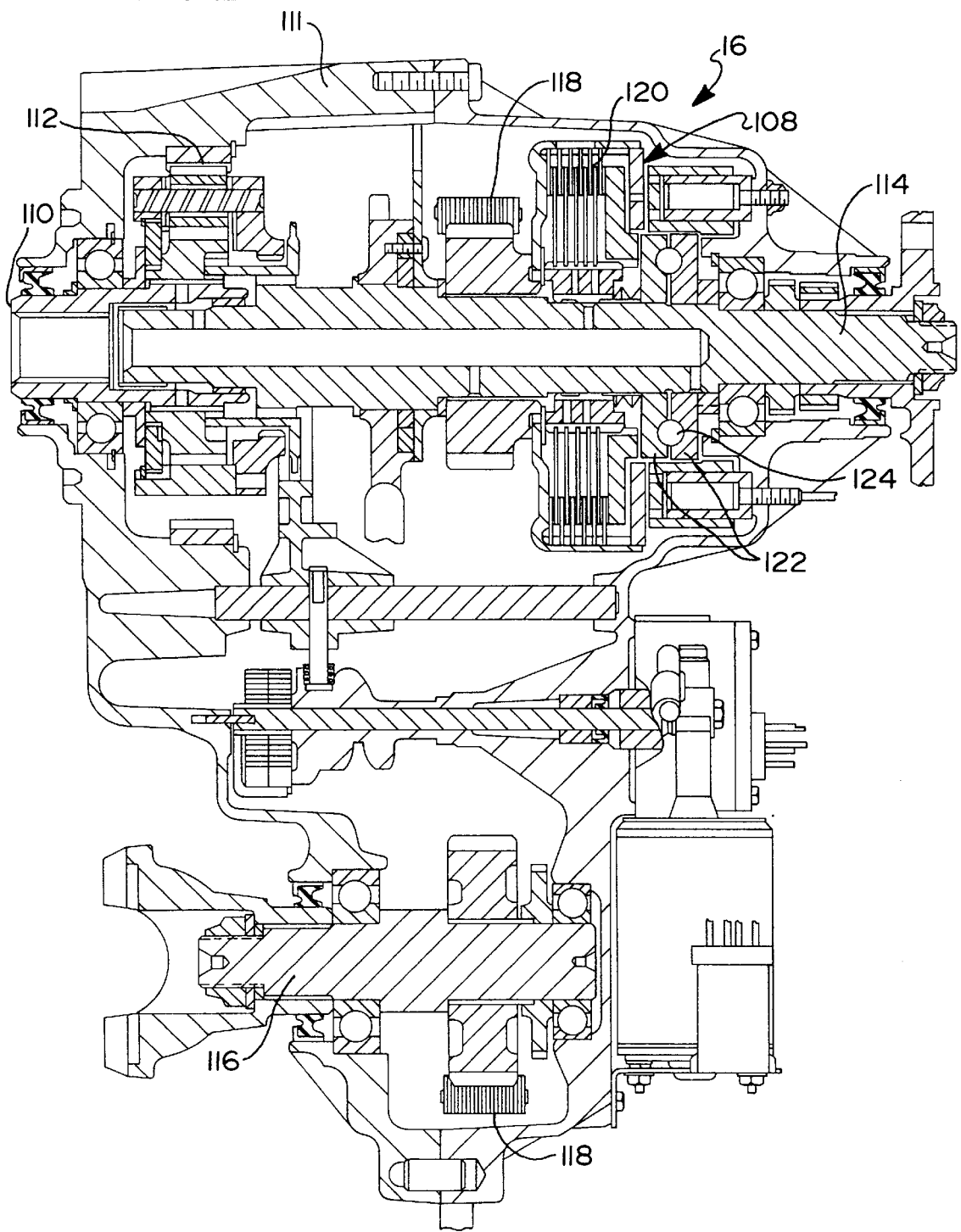
FIG. 2 is a cross-sectional view of a transfer case suited for use with the present invention.

Both the three sensor and four sensor versions of the traction control system 10 employ transfer case 16 which has an electromagnetic clutch 108 electrically connected to electronic control unit 26 and responsive thereto. As shown in FIG. 2, an input shaft 110 is rotatably supported in transfer case housing 111. Input shaft 110 receives torque from transmission 14. A planetary gear set 12 connects input shaft 110 with primary output shaft 114. Primary output shaft 114 is also rotatably supported in housing 111, and is rotatably fixed to rear drive shaft 18. Also rotatably mounted in housing 111 is a secondary output shaft 116 which is rotatably fixed to front drive shaft 22. A chain link belt 118 wraps around sprockets on shafts 114 and 116. The sprocket on secondary output shaft 116 is fixed thereto for unitary rotation therewith. The sprocket on primary output shaft 114 rotates freely thereon unless a clutch pack 120 provides a driving connection between shaft 116 and the sprocket located thereon. Clutch pack 120 can be selectively engaged by energizing a coil within electromagnetic clutch 108 causing cam plates 122 to index relative to each other. Cam grooves in which cam plate rollers 124 are disposed cause plates 122 to separate and axially load clutch pack 120 responsive to an application of current to the coil.

The invention operates in the following manner. Engine 12 provides torque to transmission 14, the torque varying in part as a function of engine throttle position. Transmission 14 multiplies the torque from engine 12 by a transmission ratio selected to provide an optimal level of output torque based in part on engine throttle position and vehicle velocity.

The output torque from transmission 14 is communicated to transfer case 16 through input shaft 110. Planetary drive 112 transmits the torque from input shaft 110 to primary output shaft 114 at a one-to-one ratio, unless the low-gear ratio is elected by the driver, in which case planetary gear set 112 multiples the torque at input shaft 110 by a fixed ratio. Planetary gear set 112 can also be placed in a neutral mode in which no torque is transmitted from input shaft 110 to primary output shaft 114. In a two wheel drive mode, essentially 100% of the torque in primary output shaft 114 is transmitted to rear drive shaft 18.

Torque from output shaft 18 is passed through pinion 32 to axle shafts 34 and 36 via ring gear 29 and differential 30. The ratio between pinion 32 and the ring gear 29 provides a further multiplication of the torque.

Under full traction conditions, the torque in both rear axle shafts 34 and 36 is approximately equal. However, if either of rear wheels 38 and 40 slip, then the torque in both rear axle shafts 34 and 36 drops to approximately zero. As the torque drops to near zero, the forward driving force is similarly reduced. This assumes that differential 30 is an open differential, and not a locking or limited slip differential which would tend to force both axle shafts 34 and 36 to rotate in unison so as too apply torque to the non-slipping wheel even if one of wheels 38 and 40 is developing little or no reaction torque.

When slip occurs on just one side of rear axle 20, the axle shaft on the side which is slipping will rotate at a higher speed than the axle which is not slipping. Since the rotational speed of ring gear 29 equals an average of the two axle shaft speeds, and the average rear wheel speed, the speed of ring gear 29 will vary linearly with the speed of a slipping wheel when the speed of the non-slipping wheel remains constant. The rotational speed of rear ring gear 29 is monitored by the electronic control unit 26 using rear ring gear speed sensor 46. The rotational speed of rear ring gear 29 must be compared with the rotational speeds indicated by signals from front wheel speed sensors 62 and 64. Vehicle speed is estimated by averaging signals from front wheel speed sensors 62 and 64 and multiplying the average wheel speed in units of RPM by two times $\pi$ times the rolling radius of the tires. If the rolling radius of the tires is provided in inches, this yields a velocity in units of inches per minute. The speed, however, is directly proportional to front ring gear 47 and front differential 48. The theoretical speed of front differential 48, independent of whether front differential 48 is actually rotating or not, can be calculated by averaging the speed of axle shafts 50 and 52. When the rotary speed of rear ring gear 29 is greater than the calculated speed of front differential 48, it is indicative that one of wheels 38 and 40 is slipping. Of course, it should be appreciated that instead of using the ring gear and calculated differential speeds, the rear ring gear speed could be converted into an equivalent average rear drive shaft speed for comparison to a calculated front drive shaft speed. It should further be appreciated that the values could be converted to some arbitrary standard corresponding to neither wheel speed nor drive shaft speed. When the rotational speed of rear ring gear 29 exceeds that of front differential 48, or exceeds it by some predetermined value, electronic control unit 26 assumes that one of wheels 38 and 40 is slipping, and initiates engagement of electromagnetic clutch 108 within transfer case 16. A value other than zero may be used to prevent undesired clutch engagements from occurring. The clutch engagement transfers a portion of the torque in primary output shaft 114 to secondary output shaft 116. Assuming that neither wheel 54 nor wheel 56 slips, torque builds in secondary drive shaft 22 and in axle shafts 50 and 52, developing vehicle thrust force at the contact patches of wheels 54 and 56. However, if one of wheels 54 and 56 slip, then the torque in drive shaft 22 is significantly reduced.

The electronic control unit 26 is able to determine that one of front wheels 54 and 56 is slipping by comparing the rotational speeds of the two wheels, 54 and 56. If one exceeds the other, or exceeds the other by a predetermined value, then the electronic control unit will act to reduce and eliminate the relative slipping. The benefit of using a predetermined value of shaft speed difference greater than zero for the value needed before slip control begins is that it avoids false engagements of slip control due to slight variations in wheel speed due to turning and other maneuvers creating differential speeds for which it is undesired to trigger an unwanted engagement of the traction control.

The traction control system disclosed relies on applying brake torque to the slipping wheel to develop torque at the wheel on the other side of the axle where tractive effort is hopefully possible. For traction control of the front axle 24, front circuit 65 must therefore be pressurized. When ECU 26 determines that one of the front wheels 54 and 56 is spinning too fast relative to the other, indicating a slip condition of that wheel, it directs a signal to motor 86 driving pumps 87 and 88. To prevent undesired braking pressure from building up in rear circuit 66, both valves 80 and 82 are maintained in an open position by electronic control unit 26 to allow fluid to circulate without an increase in line pressure. To prevent pressurized fluid in front circuit 65 from merely being diverted through master cylinder 67 to a brake fluid reservoir (not shown), valve 93 is moved to a closed position by electronic control unit 26. The pressure cut off valve of the non-slipping wheel is closed to prevent a brake application of that wheel, and its corresponding pressure relief valve is opened. The brake pressure cut off valve for the slipping wheel is pulsed between an open and closed position as is the corresponding pressure relief valve which is pulsed in synchronization therewith. This pulsing brake application gradually slows the slipping wheel until its speed approximately equals that of the non-slipping wheel and there is approximately equal torque distribution between the two. When the speeds of wheels 54 and 56 stabilize in an equilibrium condition where the speeds are approximately equal to each other, electronic control unit 26 ceases the operation of pump 86 and the pulsation of the slipping brake valves, and returns the brake control valves back to their normally open and normally closed positions, thereby enabling a regular brake apply.

By way of example, assume that both the right front and the right rear wheels 56 and 40 are on glare ice and the left front and left rear wheels 54 and 38 are on dry pavement. With the vehicle in two wheel drive, starting from a complete stop, right rear wheel 40 spins and left rear wheel 38, left front wheel 54, and right front wheel 56 all remain stationary. While the signals from the two front wheel speed indicators 62 and 64 indicate to the electronic control unit that the vehicle is not moving, rear ring gear speed sensor 46 indicates that at least one of the rear wheels 38 and 40 is slipping. Electronic control unit 26 sends a signal to transfer case 16, specifically to electromagnetic clutch 108, transferring torque from primary output shaft 114 to secondary output shaft 116. Torque transmitted to secondary output shaft 116 is communicated through drive shaft 22 and through differential 48 to axle shafts 50 and 52. However, no significant amount of torque develops because right front wheel 56 which is also on ice begins to slip and left front wheel 54 remains stationary.

Electronic control unit 26 compares the speed of wheel 54 with the speed of right front wheel 56 and determines that the standard required to establish a slipping condition has been exceeded. Electronic control unit 26 sends out electrical signals opening valve 82 and 80 as required, closing valves 93 and 70 and energizing motor 86. Pump 87 supplies pressurized fluid to pressure line 71 via return line 91. If, for any reason, the pressure in line 91 becomes excessive, then pressure relief valve 94 will open to allow pressurized fluid to be returned to a fluid reservoir via master cylinder 67. This occurs at approximately 1,500 psi. Valve 74 is pulsed between an open and closed position and valve 76 is intermittently cycled between closed and open positions in sync with 74, providing a pulsing brake application to brake 60. This intermittent application of brake 60 transfers torque to left front wheel 54, enabling it to move the vehicle forward. As the speed and torque distribution between wheels 54 and 56 becomes equalized, and both wheels 54 and 56 move to dry pavement, energization of motor 86 by electronic control unit 26 is terminated, and the traction control/anti-lock brake system valves are returned to the normal conditions shown in FIG. 3.

The embodiment of FIGS. 4 and 5 works in essentially the same manner, except that instead of using a single ring gear speed sensor 46 to determine whether there is slippage in the rear axle, the individual wheel speeds are compared with each other to determine if there is slippage. Alternatively, with a four sensor system, the speeds of wheels 38 and 40 could be averaged to derive an equivalent axle shaft speed which would be used by the electronic control unit in the same fashion as the directly measured axle shaft speed from sensors 46 in the first embodiment. Another difference between the first embodiment and the embodiment of FIGS. 4 and 5 would be that upon energization of pump motor 86, both valves 102 and 106 would need to be moved to their open positions to prevent unintentional lockup of the rear wheels by the brakes.

It is evident that many alternatives, modifications and variations of the traction control system of the present invention will be apparent to those skilled in the art in light of the disclosure herein. It is intended that the metes and bounds of the present invention be determined by the appended claims rather than by the language of the above specification, and that all such alternatives, modifications, and variations which form a conjointly cooperative equivalent are intended to be included within the spirit and scope of these claims.

We claim:

1. A traction control system for a four wheel drive vehicle comprising:

an electronic controller;

a rear axle having rotatable left rear and right rear axle shafts and having a rotatable rear pinion member;

a left rear wheel rotatably fixed relative to the left rear axle shaft;

a right rear wheel rotatably fixed relative to the right rear axle shaft;

a left rear wheel brake functionally disposed between a non-rotatable structure of the vehicle and the left rear wheel wherein the left rear wheel brake operably resists rotation between the left rear wheel and the vehicle structure;

a right rear wheel brake functionally disposed between a non-rotatable structure of the vehicle and the right rear wheel wherein the right rear wheel brake operably resists rotation between the right rear wheel and the vehicle structure;

a front axle having rotatable left front and right front axle shafts and having a rotatable front pinion member;

a left front wheel rotatably fixed relative to the left front axle shaft;

a right front wheel rotatably fixed relative to the right front axle shaft;

a left front wheel brake functionally disposed between a non-rotatable structure of the vehicle and the left front wheel wherein the left front wheel brake operably resists rotation between the left front wheel and the vehicle structure;

a right front wheel brake functionally disposed between a non-rotatable structure of the vehicle and the right front wheel wherein the right front wheel brake operably resists rotation between the right front wheel and the vehicle structure;

a transfer case having an input shaft receiving input torque from a vehicle transmission and having a primary output shaft rotatably connected to the rear pinion member and to the input shaft and having a secondary output shaft rotatably connected to the front pinion member and the transfer case having a selectively engageable clutch connecting the primary output shaft with the secondary output shaft and responsive to an electrical signal and electrically connected to the electronic controller;

a source of pressurized fluid electrically connected to the electronic controller and responsive to electrical signals therefrom;

a hydraulic circuit connecting the source of pressurized fluid to the wheel brakes;

a first solenoid operated valve disposed in the hydraulic circuit between the source of pressurized fluid and the left front wheel brake selectively blocking a flow of hydraulic fluid from the source of pressurized fluid to the left front wheel brake and the first solenoid operated valve being responsive to an electrical signal and electrically connected to the electronic controller;

a second solenoid operated valve disposed in the hydraulic circuit between the source of pressurized fluid and the right front wheel brake selectively blocking a flow of hydraulic fluid from the source of pressurized fluid to the right front wheel brake and the second solenoid operated valve being responsive to an electrical signal and electrically connected to the electronic controller;

a third solenoid operated valve disposed in the hydraulic circuit between the source of pressurized fluid and at least one of the rear wheel brakes selectively blocking a flow of hydraulic fluid from the source of pressurized fluid to the at least one of the wheel brakes and the third solenoid operated valve being responsive to an electrical signal and electrically connected to the electronic controller;

a first rotary speed sensor located at one of the left front wheel and a part that rotates substantially in unison with the left front wheel wherein the first rotary speed sensor provides an electrical signal corresponding to the speed of the left front wheel and is electrically connected to the electronic controller;

a second rotary speed sensor located at one of the right front wheel and a part that rotates substantially in unison with the right front wheel wherein the second rotary speed sensor provides an electrical signal corresponding to the speed of the right front wheel and is electrically connected to the electronic controller;

a third rotary speed sensor located proximate to one of the rear axle, the transfer case, and a drive shaft between the transfer case and the rear axle, enabling an approximate measurement of the rotary speed of the rear ring gear wherein the third rotary speed sensor provides an electrical signal relating to the speed of the rear ring gear and is electrically connected to the electronic controller; and the electronic controller including means for determining values relating to the rotative speeds of the front and rear ring gears using signals from the sensors and also including means for comparing the values relating to the front and the rear rotative speed signals and means for generating an electrical signal used to control the clutch within the transfer case based on a difference between the values relating to the front axle and the rear axle ring gear speeds and a difference in the signals from the front rotary speed sensors indicative of a slipping front wheel wherein a brake torque applied to the slipping front wheel transfers torque to the non-slipping front wheel.

2. A traction control system as claimed in claim 1 wherein the third rotary speed sensor is located at any part that rotates substantially in unison with the left rear wheel with the third sensor providing an electrical signal corresponding to the speed of the left rear wheel and the traction control system has a fourth rotary speed sensor located at any part that rotates substantially in unison with the right rear wheel wherein the sensor provides the electrical signal corresponding to the speed of the right rear wheel and together the signals from the sensors are used to determine if either of the rear wheels is slipping.

* * * * *